United States Patent [19]

Schickfluss

[11] 4,311,836
[45] Jan. 19, 1982

[54] WATER-INSOLUBLE AZLACTONE DYESTUFFS, PROCESSES FOR THEIR PREPARATION AND THEIR USE FOR DYEING OR PRINTING SYNTHETIC FIBER MATERIALS

[75] Inventor: Rudolf Schickfluss, Kelkheim, Fed. Rep. of Germany

[73] Assignee: Hoechst Aktiengesellschaft, Frankfurt am Main, Fed. Rep. of Germany

[21] Appl. No.: 197,936

[22] Filed: Oct. 17, 1980

[30] Foreign Application Priority Data

Oct. 19, 1979 [DE] Fed. Rep. of Germany ....... 2942276

[51] Int. Cl.³ ............................................ C09B 23/00
[52] U.S. Cl. ........................................ 542/443; 8/690; 8/922; 260/37 NP; 260/40 P
[58] Field of Search ...................... 8/690, 922; 542/443, 542/447, 450

[56] References Cited

U.S. PATENT DOCUMENTS

| 3,617,170 | 11/1971 | Hansen | 8/638 |
| 3,847,909 | 11/1974 | Schickfluss et al. | 542/450 |
| 4,005,080 | 1/1977 | Koch | 542/446 |
| 4,093,585 | 6/1978 | Teise et al. | 260/40 P |
| 4,097,444 | 6/1978 | Teise et al. | 260/40 P |
| 4,142,043 | 2/1979 | Koch | 542/433 |

FOREIGN PATENT DOCUMENTS

2031133 12/1971 Fed. Rep. of Germany.
2415819 10/1975 Fed. Rep. of Germany.

*Primary Examiner*—A. Lionel Clingman

*Attorney, Agent, or Firm*—Curtis, Morris & Safford

[57] ABSTRACT

Water-insoluble azlactone dyestuffs of the formula

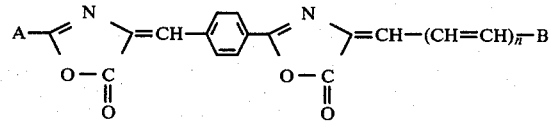

wherein A represents phenyl, chlorophenyl, bromophenyl, lower alkyl-phenylene, lower alkoxy-phenylene or pyridyl, B represents phenyl, chlorophenyl, lower alkyl-phenylene, lower alkoxy-phenyl, di(lower alkyl)amino-phenylene, cyano-phenyl,

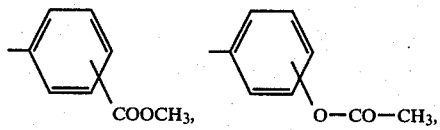

acetylamino-phenylene, nitro-phenyl, methylenedioxyphenyl, naphthyl, furyl, thienyl, pyrollyl, N-lower alkyl-pyrollyl, pyridyl or indolyl, and n stands for the integer 0 or 1, said dyestuffs being suitable—alone or in mixture with one another or in mixture with other dyestuffs—for the dyeing or printing of synthetic fibrous materials, such as fibers of cellulose di, 2½- or triacetate, polyamides or particularly of polyesters, such as polyethylene terephthalate.

11 Claims, No Drawings

WATER-INSOLUBLE AZLACTONE DYESTUFFS, PROCESSES FOR THEIR PREPARATION AND THEIR USE FOR DYEING OR PRINTING SYNTHETIC FIBER MATERIALS

The present invention relates to new water-insoluble azlactone dyestuffs of the general formula (1)

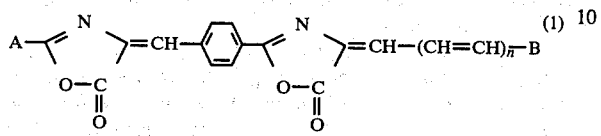

in which A denotes a phenyl radical, which can be substituted by halogen atoms, alkyl and/or alkoxy groups having 1 to 4 carbon atoms, or denotes a naphthyl radical or heterocyclic radical, B denotes a phenyl radical, which can be substituted by halogen atoms or alkyl and/or alkoxy groups having 1 to 4 carbon atoms or a nitro, cyano, acetamino, carboxylic acid methyl ester, carboxylic acid ethyl ester, acetoxy, dimethylamino, diethylamino or methylenedioxy group, or denotes a naphthyl radical or heterocyclic radical, and n denotes the number 0 or 1, and processes for their preparation.

Examples which may be mentioned of heterocyclic radicals for A are the radicals of furan, pyridine, quinoline and 1-phenyl-5-pyrazolone.

Examples which may be mentioned of heterocyclic radicals for B are the radicals of furan, pyridine, indole, thiophen, pyrrole or a N-alkyl-pyrrole.

Particularly valuable dyestuffs of the formula (1) are those of the formula (2)

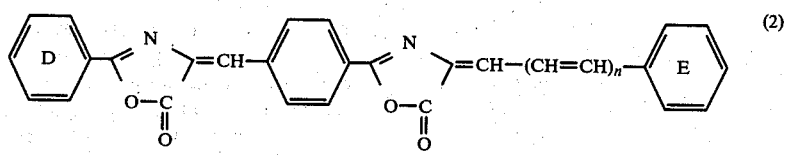

in which n is the number 0 or 1 and the phenyl radical D can be substituted by halogen atoms, such as, for example, chlorine or bromine atoms, or alkyl and/or alkoxy groups having 1 to 4 carbon atoms, and the phenyl radical E can be substituted by halogen atoms, such as, for example, chlorine or bromine atoms, or alkyl and/or alkoxy groups having 1 to 4 carbon atoms or a nitro, cyano, acetamino, carboxylic acid methyl ester, carboxylic acid ethyl ester, acetoxy, dimethylamino, diethylamino or methylenedioxy group.

The precursors are prepared by subjecting compounds of the formula (3)

A—CO—NH—CH$_2$—COOH     (3)

preferably hippuric acids of the formula (4)

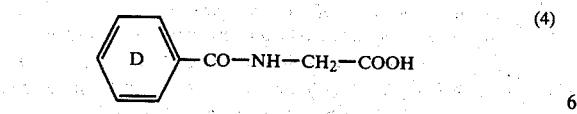

to a condensation reaction with 4-formylbenzoic acid (5)

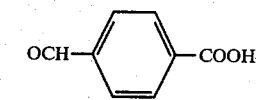

with the elimination of water.

The reaction product (6) or (7)

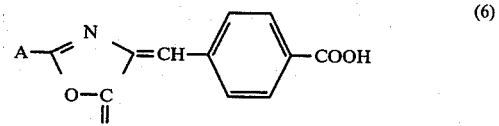

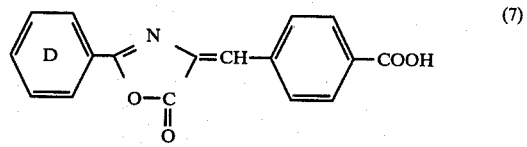

which is thus obtained is converted in a known manner to the compound (8) or (9)

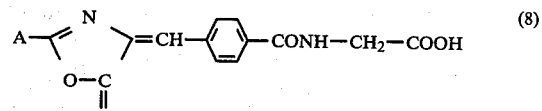

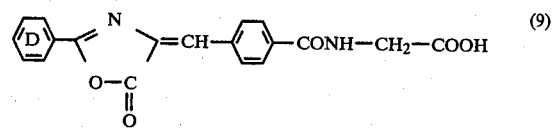

The precursors (8) and (9) are subjected, in a manner which is known in principle, to a condensation reaction with aldehydes of the formula (10) and (11)

D—(CH=CH)$_n$—CHO     (10)

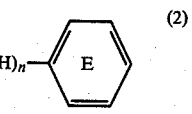

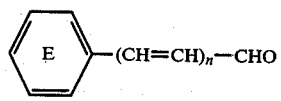

with the elimination of water, to give the dyestuffs of the formulae (1) and (2) indicated further above.

In the formulae (3) and (4) and also (6) to (11), A, B, D, E and n are as defined above.

The condensation reaction to give the dyestuffs (1) and (2) is appropriately carried out in organic solvents, such as, for example, in acetic anhydride or trifluoroacetic anhydride, or in solvent mixtures, such as, for example, mixtures of sulfur trioxide and dimethylformamide or dioxan and dicyclohexylcarbodiimide, using an elevated temperature of about 40° to 200° C. and preferably between about 80° and about 150° C. The addition of an agent having a basic action, such as, for example, sodium acetate, potassium bicarbonate, potassium carbonate, pyridine or triethylamine is frequently of advantage for the condensation reaction.

Although as a rule it is appropriate to react 1 mole of the precursor of the formula (8) or (9) with 1 mole of the aldehyde of the formula (10) or (11), the aldehyde can also be employed in a molar excess of up to about 10%.

The novel dyestuffs are suitable, on their own or in a mixture, whether with one another or with other dyestuffs, and preferably in the form of a formulation, such as, for example, in aqueous dispersion or in solution in organic solvents or in an emulsion or dispersion, which can also contain water in addition to a solvent or a solvent mixture, for dyeing or printing synthetic fiber materials, such as, for example, fibers of cellulose diacetate, cellulose 2½-acetate and cellulose triacetate and polyamides, but in particular fibers of polyesters, such as polyethylene terephthalates.

For dyeing or printing, the synthetic fiber materials mentioned above can also be in the form of mixtures with one another or with natural fiber materials, such as cellulose fibers or wool. Furthermore, for dyeing, they can be in diverse stages of processing, such as, for example, in the form of slubbings, flocks, filaments, woven fabrics or knitted fabrics.

The dyestuffs according to the invention are applied in a manner which is known in principle, from aqueous dispersion, but can also preferentially be applied from organic solvents. Dispersing of the dyestuffs can be effected, for example, by grinding in the presence of a dispersing agent, such as, for example, the condensation product of formaldehyde and a naphthalenesulfonic acid.

In other respects the dyeing conditions depend substantially on the nature of the particular synthetic fiber materials and their state of processing.

For example, dyeing of shaped structures of cellulose acetate is carried out in a temperature range of 75° to 85° C. Cellulose triacetate fibers are dyed at temperatures between about 90° and 125° C. The dyestuffs are applied to polyamide fiber materials in the temperature range between about 90° and 120° C. For dyeing fiber materials made of polyesters, the methods known for this purpose are used, the fiber material being dyed in the presence of carriers, such as o- or p-phenylphenol, methylnaphthalene or methyl salicylate, at temperatures of about 100° to 130° C., or preferably without the use of carriers and at correspondingly higher temperatures, for example at between about 120° and about 140° C. In addition, it is also possible, in particular, to use a procedure in which the dyestuffs are applied by padding, with or without thickeners, for example with tragacanth thickener, and fixed by the action of heat, for example by steam or dry heat for about ½ to 30 minutes at temperatures in the range of about 100° to 230° C. In order to improve the fastness to rubbing, the material dyed in this way is then appropriately freed from dyestuff adhering to the surface, for example by rinsing or by a reductive after-treatment. This after-treatment is in general carried out at 60° to 120° C. in a liquor which contains aqueous sodium hydroxide solution, sodium dithionite and a non-ionic detergent, such as, for example, an ethylene oxide-phenol adduct.

For dyeing the synthetic fiber materials from organic solvents it is possible, for example, to use a procedure in which the dyestuff is allowed to be taken up from the solution onto the fiber at room temperature or above, preferably at about 70° to 130° C., and if desired under pressure. Examples of suitable solvents from the exhaustion process are water-immiscible solvents with boiling points between 40° and 170° C., such as, say, the aliphatic halogenated hydrocarbons, such as methylene chloride, trichloroethane, trichloroethylene, perchloroethylene or trifluorotrichloroethane. The solvents can also be in the form of mixtures with one another and can contain further auxiliaries soluble in the solvent, such as, for example, oxalkylation products of fatty alcohols, alkylphenols and fatty acids.

In order to produce prints on the synthetic fiber materials, for example made of polyesters, the dyestuffs according to the invention can be used in the form of water-containing formulations, which in addition to the finely dispersed dye can contain suitable thickeners and fixing accelerators. Fixing of the dyestuffs is effected, for example, after printing and drying by steaming at atmospheric pressure or under an elevated pressure of up to 2.5 atmospheres gauge for 10 to 60 minutes.

Fixing of the dyestuffs can also be effected by the action of hot air at 160° to 210° C. for 30 seconds to 10 minutes.

The azlactone dyestuffs described in this specification are also particularly suitable for mass dyeing, especially spin dyeing, because they have an outstanding heat stability up to temperatures of 300° C.

Water-insoluble, thermoplastic polymers and polycondensation products which may be mentioned are polystyrene, polymethacrylate, polyamide, plasticizer-free polyvinyl chloride and in particular linear polyesters, such as, for example, polyethylene glycol terephthalate.

For carrying out the process, the abovementioned dyestuffs can be added to the starting materials when carrying out the condensation reaction to prepare the polycondensation products, such as polyesters. For the production of dyeings it is likewise possible to apply the dyestuffs to the finished, not yet shaped polymers or polycondensation products, such as, for example, polyester materials, for example by dry blending or mixing, and then to subject the material treated in this way to a melting process for final mixing and shaping. For shaping, the polymers or polycondensation products dyed in this way, such as, for example, polyester materials, can, from the melt, for example be spun to filaments, drawn to give films or brought into a specific form by injection molding, the conventional installations being used.

The dyestuff content of the materials dyed according to the process depends on the desired depth of color. In general, amounts of dyestuff of between about 0.05 and 3% are used, based on the weight of the thermoplastic material.

Brilliant yellow to red dyeings with good fastness properties, in particular good fastness to light and sublimations, can be obtained with the new dyestuffs. Furthermore, deep, brilliant, yellow to red dyeings, which usually have very good fastness to light and rubbing, outstanding fastness to thermofixing and, in particular, outstanding stability to heat, are obtained with these dyestuffs by the conventional methods of mass dyeing.

A particular advantage of the dyestuffs described in this specification is that the end components A and B in the general formula (1) can be different. Such dyestuffs have not been described hitherto in the azlactone dyestuff field. In German Pat. Nos. 1,809,949 and 2,225,546 and German Offenlegungsschriften Nos. 2,031,133, 2,408,846 and 2,415,819, the end components in a given dyestuff are identical. If two different end components are employed in these dyestuffs, mixtures of three azlactone dyestuffs are obtained. In the case of the dyestuffs according to the invention greater possibilities exist for obtaining a specific color shade.

In the examples which follow, parts and percentages are by weight, unless indicated otherwise.

EXAMPLE 1

35.0 g (0.1 mole) of the substituted hippuric acid of the formula

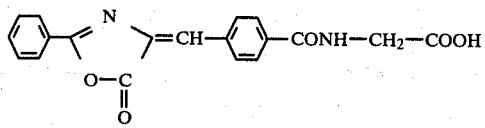

which is obtainable by subjecting hippuric acid to a condensation reaction with 4-formylbenzoic acid, converting the reaction product into the acid chloride and reacting the latter with glycine, and 13.6 g (0.1 mole) of 4-methoxybenzaldehyde in 120 ml of acetic anhydride, with the addition of 5 g of anhydrous sodium acetate, are heated at the boil under reflux for 3 hours. 180 ml of water are then added to the reaction mixture and the mixture is stirred for a further 30 minutes at about 80° C. The suspension is then filtered whilst still warm and the product is washed with 250 ml of water which has been warmed to 70° C. The dyestuff, which has the following formula,

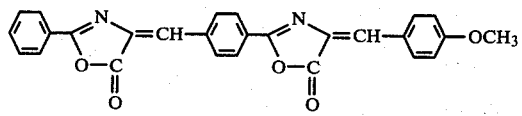

is then dried at about 70° C. 38.2 g of a yellow powder are obtained, which on polyester fibers gives a brilliant, reddish-tinged yellow dyeing with very good fastness to light and very good fastness to sublimation.

If the dyestuff is used for spin dyeing polyester, brilliant, reddish-tinged yellow polyester fibers are obtained.

EXAMPLE 2

35.0 g (0.1 mole) of the substituted hippuric acid used in Example 1 and 14.0 g (0.1 mole) of 4-chlorobenzaldehyde in 120 ml of acetic anhydride, with the addition of 5 g of anhydrous sodium acetate, are heated at the boil under reflux for 4 hours. The dyestuff is isolated as described in Example 1.

This gives 38.6 g of the dyestuff of the following formula

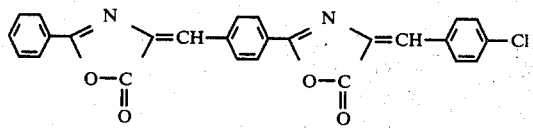

which is in the form of a yellow powder. The dyestuff dyes polyester fibers in a brilliant, greenish-tinged yellow color shade. A corresponding color shade is obtained when the dyestuff is used for spin dyeing polyesters.

EXAMPLE 3

38.4 g (0.1 mole) of the substituted hippuric acid of the following formula

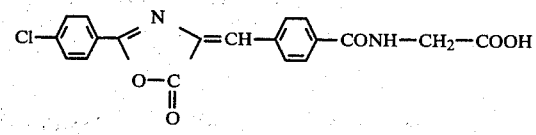

and 10.6 g (0.1 mole) of benzaldehyde in 120 ml of acetic anhydride, with the addition of 5 g of anhydrous sodium acetate, are heated at the boil under reflux for 3 hours. The dyestuff is isolated as described in Example 1.

This gives 39.4 g of the dyestuff of the following formula

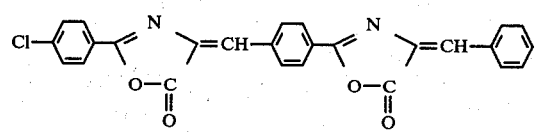

which is obtained in the form of a yellow powder. When applied by the conventional dyeing and printing processes and also when used for spin dyeing, the dyestuff dyes polyester in a brilliant, greenish-tinged yellow color shade. The dyeings and prints have very good fastness to light and fastness to sublimation.

EXAMPLE 4

35.0 g (0.1 mole) of the substituted hippuric acid used in Example 1 and 17.7 g (0.1 mole) of 4-diethylaminobenzaldehyde in 140 ml of acetic anhydride, with the addition of 4 g of anhydrous sodium acetate, are heated at the boil under reflux for 4 hours. The dyestuff is isolated as described in Example 1.

This gives 41.7 g of the dyestuff of the following formula

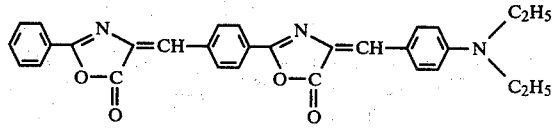

which is obtained in the form of a grey-black powder. The dyestuff dyes polyester fibers in a neutral red color shade. A corresponding color shade is obtained when the dyestuff is used for spin dyeing polyesters.

Further dyestuffs which can be prepared by the methods mentioned above and are characterized by the indicated color shades on polyester fibers are listed in the Table below:

| Example | Dyestuff | Color shade on polyester |
|---|---|---|
| 5 | Ph-oxazolone=CH-C6H4-oxazolone=CH-Ph | greenish-tinged yellow |
| 6 | Ph-oxazolone=CH-C6H4-oxazolone=CH-C6H4-CH(CH3)2 | yellow |
| 7 | H3C-C6H4-oxazolone=CH-C6H4-oxazolone=CH-Ph | yellow |
| 8 | Ph-oxazolone=CH-C6H4-oxazolone=CH-C6H4-CN | greenish-tinged yellow |
| 9 | Ph-oxazolone=CH-C6H4-oxazolone=CH-C6H4-COOCH3 | greenish-tinged yellow |
| 10 | Cl-C6H4-oxazolone=CH-C6H4-oxazolone=CH-C6H4-OCH3 | yellow |
| 11 | Ph-oxazolone=CH-C6H4-oxazolone=CH-C6H3(OCH2O) | orange |
| 12 | CH3O-C6H4-oxazolone=CH-C6H4-oxazolone=CH-C6H4-N(CH3)2 | red |
| 13 | Ph-oxazolone=CH-C6H4-oxazolone=CH-C6H4-OCOCH3 | greenish-tinged yellow |
| 14 | Ph-oxazolone=CH-C6H4-oxazolone=CH-C6H4-NHCO-CH3 | reddish-tinged yellow |
| 15 | Ph-oxazolone=CH-C6H4-oxazolone=CH-(2-furyl) | reddish-tinged yellow |
| 16 | CH3O-C6H4-oxazolone=CH-C6H4-oxazolone=CH-C6H4-OCH3 | orange |
| 17 | Cl-C6H4-oxazolone=CH-C6H4-oxazolone=CH-C6H4-N(C2H5)2 | yellowish-tinged red |

-continued
| Example | Dyestuff | Color shade on polyester |
|---|---|---|
| 18 | | yellow |
| 19 | | yellow |
| 20 | | yellow |
| 21 | | reddish-tinged yellow |
| 22 | | orange |
| 23 | | orange |
| 24 | | yellowish tinged red |
| 25 | | orange |
| 26 | | reddish-tinged yellow |
| 27 | | yellow |
| 28 | | reddish-tinged yellow |
I claim:
1. A water-insoluble azlactone dyestuff of the formula
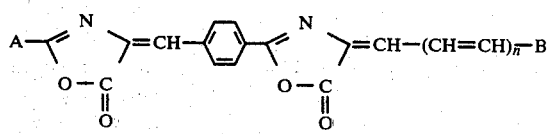

in which A is phenyl, or phenyl substituted by halogen or by one or more radicals selected from the group consisting of alkyl radicals of from 1 to 4 carbon atoms and alkoxy radicals of from 1 to 4 carbon atoms, or is naphthyl or a heterocyclic radical; B is phenyl, or phenyl substituted by halogen, by one or more radicals selected from the group consisting of alkyl radicals of from 1 to 4 carbon atoms and alkoxy radicals of from 1 to 4 carbon atoms, or by nitro, cyano, acetamino, carboxylic acid methyl ester, carboxylic acid ethyl ester, acetoxy, dimethylamino, diethylamino or methylenedioxy, or is naphthyl or a heterocyclic radical; and n is the number 0 or 1.

2. A water-insoluble azlactone dyestuff of the formula

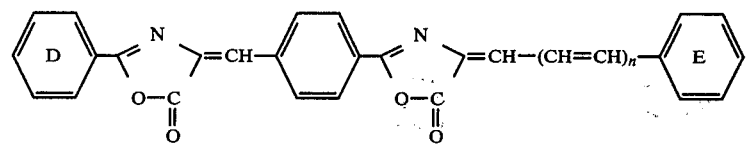

in which the radical D is phenyl or phenyl substituted by halogen or by one or more radicals selected from the group consisting of alkyl radicals of from 1 to 4 carbon atoms and alkoxy radicals of from 1 to 4 carbon atoms, and the radical E is phenyl or phenyl substituted by halogen, by one or more radicals selected from the group consisting of alkyl radicals of from 1 to 4 carbon atoms and alkoxy radicals of from 1 to 4 carbon atoms, or by nitro, cyano, acetamido, acetoxy, carboxylic acid methyl ester, carboxylic acid ethyl ester, dimethylamino, diethylamino or methylenedioxy, and n is the number 0 or 1.

3. A dyestuff as claimed in claim 1 or 2, wherein A and B are different.

4. The dyestuff of the formula

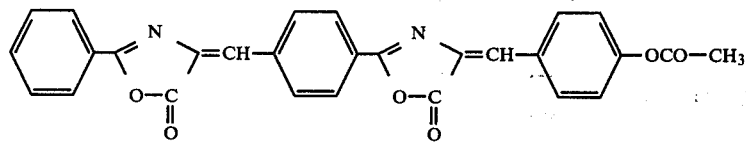

5. A process for the preparation of a water-insoluble azlactone dyestuff of the formula

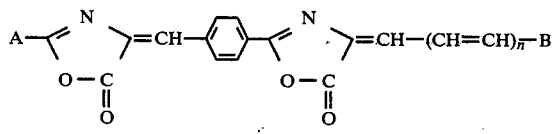

in which A is phenyl, or phenyl substituted by halogen or by one or more radicals selected from the group consisting of alkyl radicals of from 1 to 4 carbon atoms and alkoxy radicals of from 1 to 4 carbon atoms, or is naphthyl or a heterocyclic radical; B is phenyl, or phenyl substituted by halogen, by one or more radicals selected from the group consisting of alkyl radicals of from 1 to 4 carbon atoms and alkoxy radicals of from 1 to 4 carbon atoms, or by nitro, cyano, acetamido, carboxylic acid methyl ester, carboxylic acid ethyl ester, acetoxy, dimethylamino, diethylamino or methylenedioxy, or is naphthyl or a heterocyclic radical, and n is the number 0 or 1, which comprises subjecting a precursor of the formula

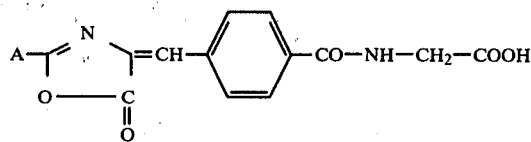

in which A is as defined above, to a condensation reaction with an aldehyde of the formula B—(CH=CH)$_n$—CHO in which B and n are as defined above.

6. A process for the preparation of a water-insoluble azlacone dyestuff of the formula

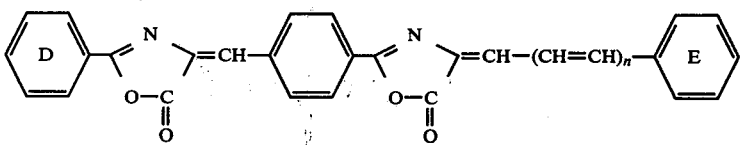

in which the radical D is phenyl or phenyl substituted by halogen or by one or more radicals selected from the group consisting of alkyl radicals of from 1 to 4 carbon atoms and alkoxy radicals of from 1 to 4 carbon atoms, the radical E is phenyl or phenyl substituted by halogen, by one or more radicals selected from the group consisting of alkyl radicals of from 1 to 4 carbon atoms and alkoxy radicals of from 1 to 4 carbon atoms, or by nitro, cyano, acetamino, acetoxy, carboxylic acid methyl ester, carboxylic acid ethyl ester, dimethylamino, diethylamino or methylenedioxy, and n is the number 0 or 1, which comprises subjecting a precursor of the formula

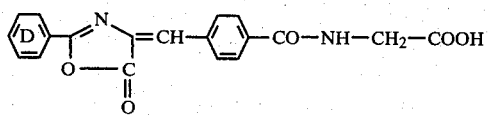

in which D is as defined above, to a condensation reaction with an aldehyde of the formula

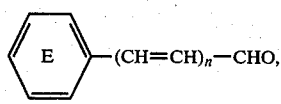

in which n and E are as defined above.

7. A process for the preparation of a water-insoluble dyestuff as claimed in claim 5 or 6, wherein the condensation reaction is carried out at a temperature of from 40° to 200° C. in an organic solvent or a mixture of organic solvents.

8. A process for the preparation of a water-insoluble dyestuff as claimed in claim 5 or 6, wherein the condensation reaction is carried out with the addition of an agent having a basic action.

9. The dyestuff of the formula

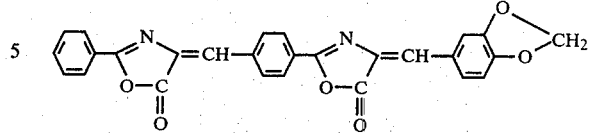

10. The dyestuff of the formula

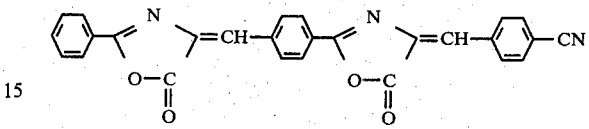

11. The dyestuff of the formula

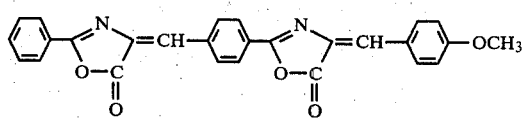

* * * * *